Patented Jan. 5, 1926.

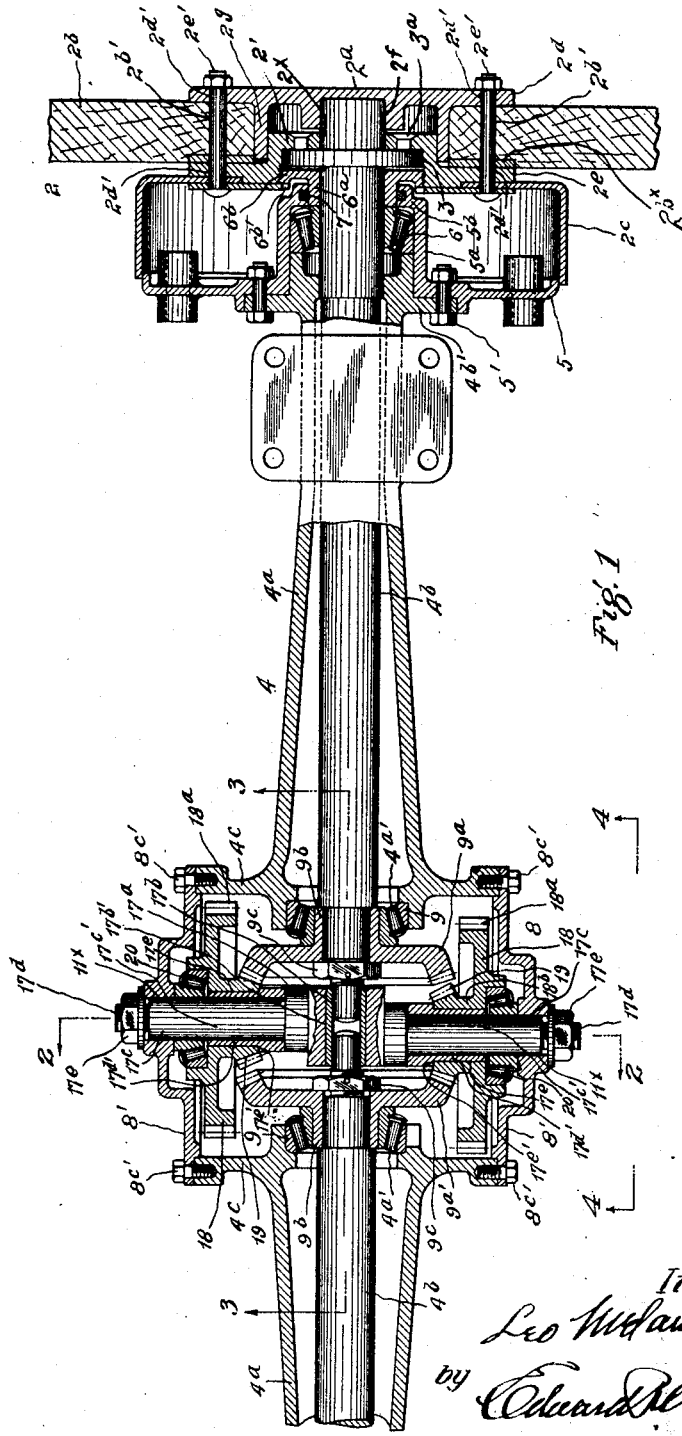

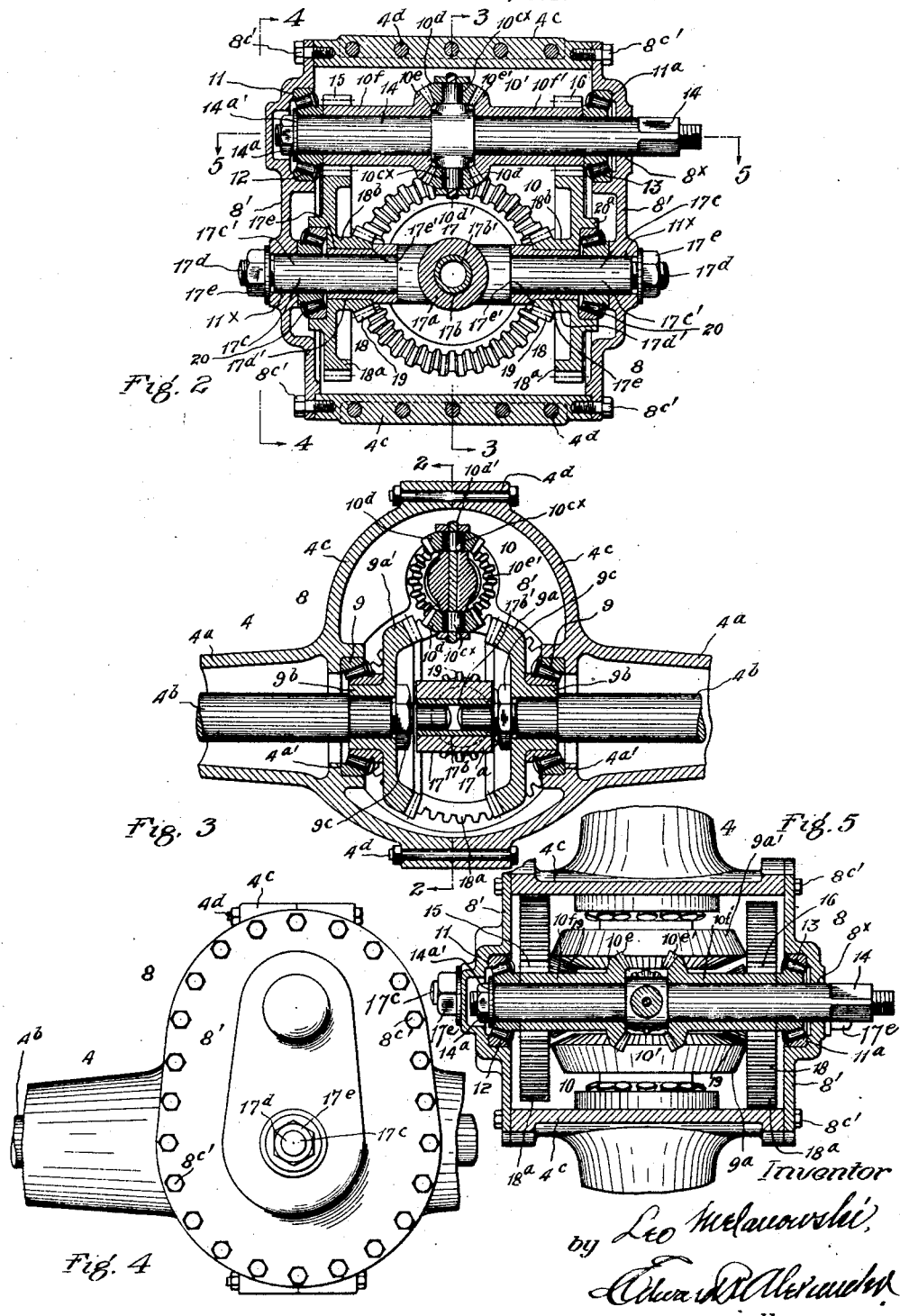

1,568,287

UNITED STATES PATENT OFFICE.

LEO MELANOWSKI, OF CLEVELAND, OHIO, ASSIGNOR TO THE CITIZENS SAVINGS AND TRUST COMPANY, OPERATING TRUSTEE, OF CLEVELAND, OHIO, A CORPORATION OF OHIO.

POWER-TRANSMITTING MECHANISM.

Application filed February 24, 1919. Serial No. 278,672.

*To all whom it may concern:*

Be it known that I, LEO MELANOWSKI, a citizen of the United States, residing at Cleveland, in the county of Cuyahoga and State of Ohio, have invented certain new and useful Improvements in and Relating to Power-Transmitting Mechanism, of which the following is a specification.

This invention relates to motor vehicles, more particularly to the power transmitting mechanism therefor.

One object of the invention is to provide an improved power transmitting mechanism capable of transmitting the power of the engine to the drive wheel or wheels of the vehicle effectively and economically.

Another object of the invention is to provide a power transmitting mechanism in which the proper speed reduction may be secured between the propeller shaft and the traction wheel or wheels to propel the vehicle positively and with minimum friction losses.

Another object of the invention is to simplify, in construction and arrangement, the elements constituting the power transmitting mechanism.

Another object of the invention is to provide mechanism of this character in which the differentail elements and proper speed reducing elements are correlated and combined to transmit the power of the propeller shaft in a relatively efficient manner.

Another object of the invention is to so construct and correlate the elements constituting differential and speed reducing elements and the housing members therefor that adjustments, assembly and disassembly of such elements and members may be readily made.

Another object of the invention is to provide an improved wheel hub and connecting means therefor with the axle.

Another object of the invention is to provide novel means for supporting the elements of the power transmitting mechanism, whereby all twisting, flexing and distortion of the driven axles are prevented and the gear elements are at all times maintained in proper co-operative relationship with each other.

A further object of the invention is to provide an improved wheel hub and housing for the bearing which supports the wheel on its axle.

Other objects of the invention will be apparent to those skilled in the art to which my invention relates from the following description, and the accompanying drawings.

For the purpose of illustration, I have, in the accompanying drawings shown and herein described one form of apparatus embodying my invention.

In the drawings, Fig. 1 is a fragmentary view, partly in section, showing a power transmitting mechanism and wheel embodying my invention.

Fig. 2 is a sectional view on the line 2—2 of Fig. 1.

Fig. 3 is a sectional view on the line 3—3 of Fig. 2.

Fig. 4 is a fragmentary, elevational view of the rear axle.

Fig. 5 is a sectional view on the line 5—5 of Fig. 2.

In the drawings, 4 indicates as an entirety that axle of a vehicle which may be propelled through a propeller shaft by suitable motive power, for example, an internal combustion motor (not shown). In the preferred embodiment of my invention, the rear axle of the vehicle is driven and the propeller shaft is connected thereto through the transmitting elements hereinafter described. The latter are preferably constructed and correlated to permit the axis of the driving element or section at or connected to the rear end of the propeller shaft to be arranged, when the chassis is disposed in normal position relative to the axes of the vehicle axles, substantially in axial alignment with the axis of the motor crank shaft, whereby the latter, said element and the intermediate element or elements constituting the propeller shaft may transmit the power of the motor with minimum friction losses.

The rear axle 4 preferably includes a pair of tubular members $4^a$. Each tubular member $4^a$ encloses a driven axle section $4^b$, which may be connected in any suitable manner to the adjacent rear wheel 2 (only one of which is shown), but preferably by the instrumentalities hereinafter described. At their inner ends the tubular members $4^a$ are flared or enlarged, as shown at $4^c$, to form the end, top and bottom walls of a housing or casing 8 for a power transmitting and speed reducing mechanism, indicated as an entirety at 10. Upon its inner wall, and at or near its inner end, each tubular member $4^a$ is preferably provided with a seat $4^{a\prime}$ for the outer race of a combined load and thrust bearing 9. The top and bottom walls of the flared ends $4^c$ meet or abut with each other (see Fig. 3) and are thickened to provide aligned openings through which bolts $4^d$ extend to removably clamp the walls together. $8'$ indicates front and rear plates for the housing 8, these plates being detachably connected to the side edges of the flared ends $4^c$ by cap screws $8^{c\prime}$.

$9^a$, $9^{a\prime}$, indicate bevel gears fixed to the driven axle sections $4^b$ in any desired manner. By preference, each axle section is reduced near its inner end to form a shoulder against which the hub $9^b$ of the adjacent gear is held by a nut $9^c$, the latter engaging screw threads on the free end of the axle section. The hub $9^b$ may be keyed to or otherwise suitably secured to the axle section, in any well known way, to turn therewith. The hub $9^b$ may form a seat for the inner race of the bearing 9, as shown in Figs. 1 and 3.

The wheel 2 may be constructed in any suitable manner. In the preferred form of construction it comprises a hub $2^a$, spokes or a spoke portion $2^b$, and a brake drum $2^c$. The hub $2^a$ may consist of outer and inner plates $2^d$, $2^e$, formed with aligned openings $2^{a\prime}$ through which bolts $2^{e\prime}$ pass to secure the plates together. An annular plate $2^{bx}$ may be fixed to the spokes to serve as a washer or bearing surface against which the hub plate $2^e$ rests. The annular plate $2^{bx}$ may be secured to the spokes by studs, the heads of which are riveted, passing through the plate, certain of the spokes and the hub plate $2^d$. $2^f$ indicates a socket or opening arranged centrally of and formed in the outer plate $2^d$ and adapted to receive the outer end of the adjacent axle section $4^b$. $2^g$ indicates an annular flange extending inwardly from the plate $2^d$ and adapted to form a base or seat on which the inner ends of the spokes $2^b$ rest. As shown in Fig. 1, the spokes $2^b$ are formed with openings $2^{b\prime}$ and the bolts $2^{e\prime}$ pass therethrough to clamp the spokes and plate $2^d$ to the plate $2^e$. At $2'$ the inner plate $2^e$ is provided with a centrally arranged, cylindrical off-set which slidably fits the inner wall of the flange $2^g$; and at $2^x$ the off-set $2'$ is formed with an opening through which the axle section $4^b$ extends. 3 indicates a collar preferably formed integral on the axle $4^b$. The collar 3 fits within the recess formed by the off-set $2'$ and is connected thereto, preferably by rivets, as shown at $3^a$, thereby forming a rigid connection between the axle $4^b$ and hub $2^a$ to drive the wheel 2. 5 indicates a plate or support rigidly fixed to a flange $4^{b\prime}$ arranged near and carried by the outer end of each tubular member $4^a$. The plate 5 may be fixed to the flange $4^{b\prime}$ by bolts $5'$, which permit the plate to be readily removed or detached. The plate 5 preferably forms a support for brake elements (not shown) which engage the brake drum $2^c$ in the usual manner. $5^a$ indicates a sleeve preferably formed integral with the plate 5. The sleeve $5^a$ surrounds the free end of the adjacent tubular axle member $4^a$ and extends outwardly therefrom. By this construction the sleeve $5^a$ forms an extension of the tubular member $4^a$, permits the free end of the latter to serve as a shoulder for the outer race of an anti-friction bearing 6, and also serves as a housing for the bearing. $6^a$ indicates an adjustable member or collar surrounding the axle section $4^b$ and arranged to engage the inner race of the bearing 6 to adjust it. At its outer end the sleeve $6^a$ is provided with a flange $6^b$, the circumferential edge of which is provided with screw threads adjustably engaging screw threads on the inner walls of the off-set $2'$. The bearings 6 and 9 are preferably of the tapered roller type and disposed to take thrusts endwise of the axle in either direction. To adjust either or both bearings, the sleeve $6^a$ is rotated in one direction or the other, thus causing the inner bearing race of the bearing 6 to move endwise of the axle.

At its outer end the sleeve $5^a$ is formed with an inwardly extending flange $5^b$ which preferably engages the adjusting sleeve $6^a$, this flange co-operating with the sleeve $6^a$ to enclose and protect the bearing 6 from the elements and foreign matters. If desired, the flange $5^b$ may be formed with a groove to receive a gasket 7, which keeps out foreign matters and at the same time forms a substantially liquid-tight joint to prevent the escape of lubricant from the bearing 6. In assembling each wheel, wheel hub and the associated elements, I place the bearing 6 within the sleeve $5^a$ and connect the latter to the outer end of the adjacent tubular member. I also secure together the axle $4^b$, hub plates $2^d$, $2^e$, to which the spokes and brake drum are connected, respectively, and the collar $6^a$. The axle $4^b$ is then positioned in the tubular member, and the nut $9^c$ tightened. If it is found that the bearings 6 and 9 are not in proper adjusted positions, the nut $9^c$ is removed and the axle $4^b$ moved endwise to permit access to the collar $6^a$. The collar $6^a$ is then adjusted to the proper extent and the axle re-positioned and secured by the nut $9^c$.

Of the power transmitting and speed reducing mechanism 10, 14 indicates a shaft section which constitutes that element of a differential mechanism $10'$ which is connected to and driven by the vehicle propeller shaft, not shown. At its front or inner end, the shaft 14 is adapted to be connected in any well known manner, but preferably by a universal joint, to the rear end of the propeller shaft, to be driven thereby. The inner end of the shaft section 14 extends through an opening $8^x$ formed therefor in the front plate $8'$, 11, $11^a$, indicate annular seats formed in the inner walls of the plates $8'$ and adapted to receive the outer races of anti-friction bearings 12 and 13, respectively, which support the opposite ends of the shaft section 14. The bearings 12, 13, are preferably of the tapered roller type and the rollers thereof are oppositely disposed, whereby they are capable of taking end thrusts on the shaft section 14 in either direction.

$10^{cx}$ indicates a plurality of studs extending radially from and preferably formed integral with the shaft section 14. $10^d$ indicates bevel pinions loosely mounted on the studs $10^{cx}$ and held thereon by heads $10^{d'}$ secured to the outer ends of the studs $10^{cx}$ in any desired manner. $10^e$, $10^{e'}$, indicate differential bevel gears having hubs $10^f$, $10^{f'}$, respectively, loosely mounted on the shaft section 14. The gears $10^e$, $10^{e'}$, mesh with the pinions $10^d$ and are rotated thereby together or relatively to each other in the usual manner. The hubs $10^f$, $10^{f'}$, are preferably of such length that their outer ends may serve as abutments for the inner races of the bearings 12 and 13. The outer or rear end of the shaft section 14 is preferably provided with screw threads which take a nut $14^a$. As shown, the nut $14^a$ acts through a washer $14^{a'}$ to retain the inner race of the bearing 12 against the outer end of the hub $10^f$ and the gear $10^e$ therefor in mesh with the pinions $10^{cx}$. At their outer ends, the sleeve hubs $10^f$, $10^{f'}$, are provided with pinions 15, 16, respectively, the purpose of which will be later described. The pinions 15, 16, may be of the spur type.

17 indicates a supporting or truss member preferably extending across the casing $8'$ and supported thereby in the manner to be presently described. The supporting or truss member 17 preferably comprises a central body portion $17^a$ formed with an opening $17^b$, in which the inner free ends of the driven axle sections $4^b$ are received and rotatably supported, and oppositely extending shaft or axle members $17^c$. As shown at $17^{b'}$, the opening $17^b$ may be provided with a suitable bearing sleeve. The outer or free ends of the axle members $17^c$ extend through openings $11^x$, $11^x$, formed therefor in the front and rear plates $8'$ and are reduced in diameter, as shown at $17^d$ in Figs. 1 and 2. These reduced ends $17^d$ are provided with screw threads to take nuts $17^e$ which, when screwed up, engage the outer walls of the plates $8'$ and thus rigidly maintain the supporting member 17 in position.

18 indicates a pair of gear elements, each rotatably mounted upon one of the shaft or axle members $17^c$. Each gear element preferably comprises a spur gear $18^a$, having a hub $18^b$ loosely fitting or surrounding the adjacent shaft member $17^c$, and a bevel pinion 19 arranged to mesh with and drive the adjacent bevel pinion $9^a$, or $9^{a'}$. The gear $18^a$, hub $18^b$ and pinion 19, constituting each gear element, are preferably formed integral. The gears $18^a$ mesh with and are driven by the pinions 15, 16. By preference, the shaft members $17^c$ are reduced, as shown at $17^{c'}$ and provided with sleeves $17^{c''}$, which form bearings for the gear hubs $18^b$; and at $17^e$ the sleeves may be reduced to form shoulders $17^{e'}$ which are engaged by and prevent axial movement of the gear hubs $18^b$ inwardly.

20 indicates an anti-friction bearing interposed between each gear element 18 and the adjacent shaft member $17^c$. The bearings 20 are arranged at or upon the outer ends of the gear elements 18 and preferably comprise tapered roller bearings, the rollers of one bearing being disposed opposite to the rollers of the other bearing so as to take thrusts in outward directions endwise of the shaft members $17^c$, incident to the operation of the bevel gears 19, and $9^a$, $9^{a'}$. The outer race of each bearing 20 may be supported in a seat formed by an annular rib $20^a$ formed on the outer face of the adjacent gear $18^a$, and the inner race of the bearing may abut against the inner face of the adjacent plate $8'$.

As shown in Fig. 1, the supporting or truss member 17 is interposed between and extends transversely across the driven bevel gears $9^a$, $9^a$, of the power transmitting elements, and the oppositely extending shaft members $17^c$ thereof are off-set relatively to each other. This construction permits the power transmitting elements between one axle section $4^b$ and the shaft 14 to be of the same construction and size as corresponding elements between the other axle section $4^b$ and the said shaft 14, and at the same time permits each gear $9^a$ or $9^{a'}$ and the adjacent pinion 19 therefor to operate without danger of contact with the other gear $9^a$ or $9^{a'}$ and the pinion 19 therefor.

My construction of power transmitting mechanism comprises but few correlated elements; at the same time it permits of differential movement between the axle sections $4^b$ or the two wheels 2 connected thereto and provides for the transmission of power to the wheels with double reduction in speed thereof relative to the speed of the propeller shaft, whereby the power of the vehicle engine may be utilized effectively.

From the foregoing description it will be seen that my power transmitting mechanism is relatively simple, although providing for the driving of the wheels with double speed reduction efficiently under all conditions of use, and that the elements thereof may be relatively small, to insure their cheap and easy manufacture, as well as ample strength and durability thereof.

All of the elements of the mechanism, as well as the driven axle sections, may be readily disassembled and assembled.

Such assembly and disassembly of the axle herein disclosed is relatively easy, as each half of the axle housing with its axle section and bevel gear are first assembled and the gears accurately positioned, together with the bearings therefor. The two parts of the housing are then brought together and the supporting or truss member 17 is held so that the ends of the axle sections project into the recess 17ᵇ. The sections are then bolted together by the bolts 4ᵈ. The bevel pinions and spur gears, together with the bearings, are positioned on the ends of the member 17 and the front and rear removable plates 8′ are then bolted to the housing, the front plate carrying the driving shaft and differential mechanism which has been previously assembled and the rear plate having a socket to receive the rear end of the shaft. When the front and rear plates 8′ are securely bolted in place, a relatively tight axle housing is formed which prevents the loss of lubricant. In case it is desired to get at either of the spur gears, it is only necessary to remove the adjacent cover plate 8′. Removing the rear plate 8′ permits the driving shaft to be removed and also the adjacent spur gear and bevel pinion to be removed from the truss member 17 if desired. Similarly, the removal of the front housing plate 8′ permits the removal of the other spur gear and bevel pinion.

It will also be seen that all of the elements of the mechanism, except the gears connected to the driven axle sections are supported by two members, to-wit, the shaft member 14 and the supporting or truss member 17 and that these members are supported at their opposite ends by the side walls of the casing 8, each of which walls may be readily removed.

The elements of my mechanism are rigidly supported for the transmission of power with minimum friction losses, thereby insuring durability and minimum repairs and adjustments. In this connection, it will be noted that the driven axles 4ᵇ are supported at their inner ends by the cross and truss member 17 which prevents at all times twisting or flexing of the driven axles or the disalignment of the driven gears 9ᵃ secured thereto relative to the other gear elements with which they mesh. As the cross member 17 is rigidly secured to and supported by the casing 8, it admirably serves to prevent the distortion and disalignment just referred to. Again, as the driving gears 19 and 18ᵃ are mounted on the axle members 17ᶜ of the cross member 17 and bear against the thrust bearings 20, they are maintained at all times in position for efficient co-action or engagement with the gears 9ᵃ and 9ᵃ′.

It will also be noted that by the provision of the cross or truss member 17, I am enabled to provide supports for each driven axle 4ᵇ upon opposite sides of and closely adjacent to the gear 9ᵃ or 9ᵃ′ that is secured thereto, and to thereby further prevent twisting, flexing or distortion of the axle 4ᵇ and disalignment of the gear 9ᵃ or 9ᵃ′ relative to its driving pinion.

It is also to be noted that with the construction herein disclosed and with the housing containing the usual amount of lubricant in the enlarged central chamber, only the relatively slow moving spur gears and bevel gears project downwardly sufficiently into the bottom portion of the chamber to dip into the lubricant. This is of advantage when the lubricant is of relatively high viscosity, as when starting, for the relatively small surface area of these gears and the relatively slow speed decreases the usual resistance or churning action occasioned by forcing relatively large surfaces of metal at relatively high speed thru the lubricant, as for example the usual revolving differential mechanism.

It is obvious that with the pairs of opposed spur gears and bevel gears arranged in substantially box-like or rectangular formation, the lubricant will be splashed throughout the housing to lubricate all of the mechanism. Furthermore, it is obvious the lubricant will be splashed at different angles, due to the fact that some of these gears are spur gears and some bevel gears.

By having the spur gears and bevel gears so arranged in a substantially box-like formation, the housing can be positioned relatively close to such gears, thus forming a relatively small and compact housing; also as there is more than one speed reduction, the spur gears and bevel gears whose axes are in the plane of the axes of the driven axle sections are relatively small and therefore do not project a great distance below the axle sections, thus permitting a relatively large road clearance.

The location of the differential mechanism is such that it is only subject to very light strains as all of the reduction takes place after the power has been transmitted through the differential. On a slippery surface this construction reduces the spinning effect of the wheels, which occurs on the conventional type axle where the differential is located on the axle shafts. A possible explanation of this may be that such resistance to the spinning of one of the wheels on a slippery surface arises from the friction or inertia naturally inherent in sets of reducing gears located between the differential mechanism and the wheels. In commercial constructions now in use even where there is a double reduction in speed it is usually customary to have one of the reductions ahead of the differential mechanism in the line of power transmission, and in this case there is noticeably more tendency to spin on a slippery surface perhaps because of the less reduction gearing between the differential and the wheels.

It will further be seen that with the construction herein disclosed the driving shaft 14 is positioned a substantial distance above the plane of the axes of the driven axle sections and the spur gears and bevel pinions, whereby said driving shaft section may be connected with the usual universal joint of the propeller shaft in a vehicle chassis, and yet the axis of such driving shaft section may be kept in substantially a horizontal plane and in alinement with the propeller shaft. This feature of construction enables my axle to be easily interchangeable with those of the worm drive and permits a substantially straight line drive.

It will further be seen that the power transmitting elements of my construction are so arranged that the propeller shaft of the vehicle is directly connected to and rotates that element of the differential mechanism which carries the differential pinions, thereby avoiding certain gear elements now usually employed.

To those skilled in the art of making mechanism of the class described, many alterations in construction and widely differing embodiments and applications of my invention will suggest themselves, without departing from the spirit and scope thereof. My disclosures and description herein are purely illustrative and are not intended to be in any sense limiting.

What I claim is:

1. The combination in a driving axle of a housing, a pair of driven axle sections arranged end to end therein, a driving shaft mounted in said housing at an angle to said driven axle sections, differential mechanism mounted on said driving shaft section and actuated thereby, and double speed reduction gearing interposed between said differential mechanism and the inner ends of said axle sections, comprising bevel gears on said axle sections meshing with bevel pinions supported in said housing, spur gears mounted to turn with said bevel pinions, spur pinions mounted to engage said spur gears, each of which spur pinions is operated from one side of said differential mechanism.

2. The combination in a driving axle of a housing, a pair of driven axle sections arranged end to end therein, a driving shaft mounted in said housing at an angle to said driven axle sections, differential mechanism mounted on said driving shaft section and actuated thereby, a shaft mounted in said housing counter to said driving shaft, bevel gears connected to the inner ends of said axle sections, bevel pinions mounted on said counter shaft and meshing with said bevel gears, spur gears mounted on said counter shaft and each connected with one of said bevel pinions thereon, and spur pinions mounted on said driving shaft each meshing with one of said spur gears and operatively connected to one side of said differential mechanism.

3. The combination in a driving axle of a housing, a pair of driven axle sections arranged end to end therein, a driving shaft and a counter shaft disposed in said housing at an angle to said driven axle sections, differential mechanism mounted on said driving shaft section and actuated thereby, and double speed reduction gearing interposed between said differential mechanism and the inner end of said axle sections, comprising bevel gears on said axle sections meshing with bevel pinions driven by spur gears mounted on said countershaft and meshing with spur pinions mounted on said driving shaft, each of which latter is at one side of said differential mechanism and operated thereby.

4. The combination in a driving axle of a housing, a pair of driven axle sections arranged end to end therein, a driving shaft and a countershaft disposed in said housing at an angle to said driven axle sections, differential mechanism mounted on said driving shaft section and actuated thereby, a shaft supported in said housing counter to said driving shaft and having offset sections, bevel gears connected to the inner ends of said axle sections, bevel pinions mounted on the offset sections of said counter shaft and each meshing with one of said bevel gears, spur gears mounted on said counter shaft and each connected with one of said bevel pinions thereon, and spur pinions mounted on said driving shaft, each meshing with one of said spur gears and operatively connected to one side of said differential mechanism.

5. In mechanism of the class described, the combination of a housing, a pair of gear supports carried one above the other therein transversely to the longitudinal axis thereof, a pair of driven axle sections mounted end to end in said housing, pairs of gears mounted on the lower one of said gear supports, gears each carried by the inner end of one of said axle sections and meshing with a gear of one of said pairs of gears on said lower gear support, differential gearing on the upper gear support, and gears mounted on said upper gear support and each interposed between one of the differential gears and one of said gears of said pairs of gears on said lower gear support.

6. In mechanism of the class described, the combination of a housing, a pair of gear supports carried one above the other therein transversely to the longitudinal axis thereof, a pair of driven axle sections longitudinally carried in said housing, pairs of gears mounted on the lower one of said gear supports, each pair comprising a bevel pinion and a spur gear, gears, each carried by the inner end of one of said axle sections and meshing with one of said bevel pinions, differential gearing on the upper gear support, and spur pinions each mounted on said upper support, meshing with one of said spur gears on said lower gear support, and actuated from one side of said differential gearing.

7. In mechanism of the class described, the combination of a housing, a pair of gear supports carried one above the other therein transversely to the longitudinal axis thereof, a pair of driven axle sections longitudinally carried in said housing, pairs of gears mounted on the lower one of said gear supports, each pair comprising a bevel pinion and a spur gear, gears, each carried by the inner end of one of said axle sections and meshing with one of said bevel pinions, differential gearing on the upper gear support, and spur pinions each mounted on said upper gear support, meshing with one of said spur gears on said lower gear support and actuated from one side of said differential gearing, said upper gear support being rotatable to drive said differential gearing.

8. In mechanism of the class described, the combination of a housing, a pair of gear supports carried one above the other therein transversely to the longitudinal axis thereof, a pair of driven axle sections longitudinally carried in said housing, pairs of gears mounted on the lower one of said gear supports, each pair comprising a bevel pinion and a spur gear, gears, each carried by the inner end of one of said axle sections and meshing with one of said bevel pinions, differential gearing on the upper gear support, and spur pinions each mounted on said upper gear support, meshing with one of said spur gears on said lower gear support and actuated from one side of said differential gearing, said upper gear support being rotatable to drive said differential gearing, and said lower gear support being stationary in the housing.

9. In mechanism of the class described, the combination of a housing, a pair of gear supports carried one above the other therein transversely to the longitudinal axis thereof, a pair of driven axle sections longitudinally carried in said housing, pairs of gears mounted on the lower one of said gear supports, each pair comprising a bevel pinion and a spur gear, gears, each carried by the inner end of one of said axle sections and meshing with one of said bevel pinions, differential gearing on the upper gear support, and spur pinions each mounted on said upper gear support, meshing with one of said spur gears on said lower gear support, and actuated from one side of said differential gearing, said upper gear support being rotatable to drive said differential gearing, and said lower gear support being stationary in the housing, and provided with bearings for the inner end of said axle sections.

10. In mechanism of the class described, the combination of a housing, a pair of gear supports arranged one above the other in said housing and disposed transversely therein, the lower one being stationarily held and comprising gear receiving sections offset with respect to each other at either side of the axis of said housing, a pair of driven axle sections longitudinally carried in said housing, pairs of gears mounted on the lower one of said gear supports, each pair comprising a bevel pinion and a spur gear, gears, each carried by the inner end of one of said axle sections and meshing with one of said bevel pinions, differential gearing on the upper gear support, and spur pinions each mounted on said upper support, meshing with one of said spur gears on said lower support and actuated from one side of said differential gearing.

11. In mechanism of the class described, the combination of a housing, a pair of driven axle sections longitudinally carried in said housing, a pair of gear supports arranged one above the other in said housing and disposed transversely therein, the lower one being stationarily held and comprising gear receiving sections offset with respect to each other at either side of a bearing section for the inner ends of said axle sections, pairs of gears mounted on the lower one of said gear supports, each pair comprising a bevel pinion and a spur gear, gears, each carried by the inner end of one of said axle sections and meshing with one of said bevel pinions, differential gearing on the upper gear support, and spur pinions each mounted on said upper support, meshing with one of said spur gears on said lower support and actuated from one side of said differential gearing.

12. In mechanism of the class described, the combination of a housing, a pair of driven axle sections longitudinally carried in said housing, a pair of gear supports arranged one above the other in said housing and disposed transversely therein, bevel gears oppositely disposed, one at either side of said lower gear support and each carried by the inner end of one of said axle sections, bevel pinions mounted on said lower gear support, one at either side of the axis of said axle sections and each meshing with one of said bevel gears on an axle section, spur gears mounted on opposite ends of said lower gear support and each secured to the adjacent bevel pinion thereon, spur pinions mounted on said upper gear support within said housing and at opposite ends thereof and each meshing with the adjacent spur gear on said lower gear support.

13. In mechanism of the class described, the combination of a housing, a pair of driven axle sections longitudinally carried in said housing, a pair of gear supports arranged one above the other in said housing and disposed transversely therein the lower one having offset sections at either side, bevel gears oppositely disposed, one at either side of said lower gear support and each carried by the inner end of one of said axle sections, bevel pinions each mounted on one of said offset sections of said lower gear support and meshing with one of said bevel gears on an axle section, spur gears each secured at the larger end of one of said bevel pinions, spur pinions mounted on said upper gear support within said housing and on opposite ends thereof and each meshing with the adjacent spur gear on said lower gear support.

14. In a driving axle the combination of a differential mechanism, a driving shaft therefor, oppositely extending driven shaft sections, speed reducing mechanism, including sets of bevel gears between said differential mechanism and the sections of said driven member, and a pair of stationary axle devices disposed upon opposite sides of a vertical plane cutting the longitudinal axis of one of said shaft sections for supporting one element of each of said sets of bevel gears, whereby each set of bevel gear elements is supported out of contact with the other set of bevel gear elements.

15. In mechanism of the class described, the combination with a pair of driven axle sections, of a driven member, a supporting member supported by said housing, and speed reducing and differential mechanisms mounted on said members and operatively connected between said driven member and said driven axle sections, the opposite ends of said supporting member being off-set relative to each other to maintain certain elements connected with one axle section out of contact with certain elements connected with the other axle section.

16. In mechanism of the class described, the combination with a pair of driven axle sections and a housing, of a driven member, a supporting member supported at its opposite ends by said housing, and arranged to support the inner ends of said driven axle sections, and speed reducing and differential mechanisms mounted on said members and arranged to transmit power from said driven member to said axle sections.

17. In mechanism of the class described, the combination with a pair of driven axle sections and a housing, of a driven member, a supporting member supported at its opposite ends by said housing, and arranged to removably support the inner ends of said driven axle sections, and speed reducing and differential mechanisms mounted on said members and arranged to transmit power from said driven member to said axle sections.

18. In mechanism of the class described, the combination with a pair of driven axle sections and a housing, of a driven member, a supporting member supported at its opposite ends by said housing, and arranged to support the inner ends of said driven axle sections, speed reducing and differential mechanisms mounted on said members and arranged to transmit power from said driven member to said axle sections, and oppositely disposed thrust bearings for said driven member.

19. In mechanism of the class described, the combination with a pair of driven axle sections and a housing, of a driven member, a supporting member supported at its opposite ends by said housing, and arranged to support the inner ends of said driven axle sections, speed reducing and differential mechanisms mounted on said members and arranged to transmit power from said driven member to said axle sections, and oppositely disposed thrust bearings on said supporting member for taking thrusts on the elements supported by it.

20. In mechanism of class described, the combination of a pair of driven axle sections, a housing, bevel gears in said housing, each carried at the inner end of one of said axle sections, a differential mechanism, a gear support carried by said housing, pairs of gears independently mounted on said gear support and each comprising a bevel pinion meshing with one of said bevel gears on said axle sections and gears meshing with the other gears of each said pair of gears and actuated from opposite sides of said differential.

21. In mechanism of class described, the combination of a pair of driven axle sections, a housing, bevel gears in said housing, each carried at the inner end of one of said axle sections, a differential mechanism, a gear support carried by said housing and disposed between the inner ends of said axle sections, pairs of gears independently mounted on said gear supports and each comprising a bevel pinion meshing with one of said bevel gears on said axle sections, and gears meshing with the other gears of each said pairs of gears and actuated from opposite sides of said differential mechanism.

22. In mechanism of class described, the combination of a pair of driven axle sections, a housing, bevel gears in said housing, each carried at the inner end of one of said axle sections, a driving shaft, a differential mechanism, mounted on said driving shaft, a gear support carried by said housing, pairs of gears independently mounted on said gears support and each comprising a bevel pinion meshing with one of said bevel gears on said axle sections, and gears mounted on said driving shaft, meshing with the other gears of each said pair of gears on said gear support and actuated from opposite sides of said differential mechanism.

23. In mechanism of class described, the combination of a pair of driven axle sections, a housing, bevel gears in said housing, each carried at the inner end of one of said axle sections, a driving shaft, a differential mechanism mounted on said housing, a gear supporting member having offset gear carrying sections carried by said housing and disposed between the inner ends of said axle sections, pairs of gears independently mounted on said gears support and each comprising a bevel pinion meshing with one of said bevel gears on said axle sections, and gears mounted on said driving shaft, meshing with the other gears of each said pair of gears on said gear support and actuated from opposite sides of said differential mechanism.

24. In mechanism of the class described, the combination with a pair of alined driven axle sections, of bevel gears connected thereto, a differential mechanism, the differential members of which are provided with spur pinions, spur gears meshing with said spur pinions, and bevel pinions connected to said spur gears and meshing with said bevel gears.

25. In mechanism of the class described, the combination with a pair of driven axle sections, and a housing, of bevel gears connected thereto, a differential mechanism, the differential members of which are provided with spur pinions, spur gears meshing with said spur pinions, and bevel pinions connected to said spur gears and meshing with said bevel gears, and a supporting member for rotatably supporting said spur gears and bevel pinions, said supporting member being supported at its opposite ends by said housing.

26. In mechanism of the class described, the combination with a pair of driven axle sections of bevel gears connected thereto, a differential mechanism, the differential members of which are provided with spur pinions, spur gears meshing with said spur pinions, bevel pinions connected to said spur gears and meshing with said bevel gears, and a supporting member for rotatably supporting said spur gears and bevel pinions, and the inner ends of said driven axle sections, said supporting member being supported at its opposite ends by said housing.

27. In mechanism of the class described, the combination with a pair of alined driven axle sections, of bevel gears connected thereto, a differential mechanism the differential members of which are provided with spur pinions, and a pair of gear elements each comprising a spur gear and a bevel pinion arranged between and meshing respectively with said spur pinion and the adjacent bevel gear.

28. In mechanism of the class described, th combination with a pair of alined driven axle sections, of bevel gears connected thereto, a differential mechanism the differential members of which are provided with spur pinions, a pair of gear elements each comprising a spur gear and a bevel pinion arranged between and meshing respectively with said spur pinion and the adjacent bevel gear, and a thrust bearing for each gear element for taking thrusts in one direction imparted thereto.

29. In mechanism for the class described, the combination with a pair of driven axle sections, of bevel gears connected thereto, a differential mechanism the differential members of which are provided with spur pinions, a pair of gear elements each comprising a spur gear and a bevel pinion arranged between and meshing respectively with said spur pinion and the adjacent bevel gear, and a supporting member having offset axle sections for supporting said gear elements, whereby each bevel gear and the driving pinion therefor are supported to operate without contact with the corresponding member of the other pair.

30. In mechanism of the class described, the combination of oppositely extending tubular members the inner ends of which are shaped to form top and bottom walls of a housing, and driven axle sections mounted in said tubular members, of a pair of removable plates forming the front and rear walls of said housing, a driven member, thrust bearings arranged to take thrusts in either direction endwise of said driven member, a differential mechanism, a supporting member supported at its opposite ends by said plates, and speed reducing mechanism between said differential mechanism and said driven axle sections, said speed reducing mechanism having elements which are rotatably mounted on said supporting member, and thrust bearings between the said elements and the said plates.

31. In mechanism of the class described the combination with a pair of driven axle sections of bevel gears connected thereto, said gears opposing each other and being of the same size, a differential mechanism, spur pinions actuated thereby, spur gears meshing with said spur pinions, and bevel pinions mounted to rotate with said spur gears and meshing with said bevel gears, said spur gears, bevel pinions and bevel gears having their axes in the same plane.

32. In mechanism of the class described the combination with a pair of driven axle sections of bevel gears connected thereto, said gears being of the same size and in substantially parallel relation, a driving shaft carrying a differential mechanism, spur pinions actuated thereby, spur gears meshing with said spur pinions and bevel pinions mounted to rotate with said spur gears and meshing with said bevel gears, said spur gears, bevel pinions and bevel gears having their axes in the same plane, this being a different horizontal plane from that of the axes of the driving shaft and spur pinions.

33. In mechanism of the class described the combination with a pair of driven axle sections of bevel gears connected thereto, said bevel gears being oppositely disposed and of the same size, spur gears and bevel pinions oppositely disposed and arranged so that each bevel pinion drives one of said bevel gears, a differential mechanism, and spur pinions actuated thereby to drive said spur gears, said bevel gears being disposed between said spur gears.

34. The combination in a driving axle of a housing, a pair of driven axle sections arranged therein, a driving shaft mounted in said housing and carrying a differential mechanism, spur gears disposed relatively near opposite sides of said housing, bevel pinions between said spur gears, each pinion mounted to rotate with one of said spur gears, bevel gears connected to the ends of said axle sections and disposed between said spur gears, and spur pinions actuated by said differential mechanism to drive said spur gears.

35. The combination in a driving axle of a housing, a pair of driven axle sections arranged end to end therein and having bevel gears mounted thereon, a support carried by the housing, a spur gear and a bevel pinion mounted at each of two opposite sides of the housing to rotate on said support, said bevel pinions being disposed to engage said bevel gears, a driving shaft mounted in said housing and carrying a differential mechanism thereon, spur pinions mounted in said housing and actuated by said differential mechanism to drive said spur gears.

36. The combination in a driving axle of a housing, a pair of axle sections arranged therein, bevel gears connected to said sections to drive them, spur gears mounted for rotation near opposite sides of the housing, bevel pinions between said spur gears to drive said bevel gears, each of said pinions being mounted to rotate with one of said spur gears, a driving shaft mounted in said housing, a differential mechanism mounted thereon and actuated thereby, and spur pinions each operated from one side of said differential to drive said spur gears.

37. The combination in a driving axle of a housing, a pair of axle sections arranged therein, opposed bevel gears connected thereto to drive said sections, spur gears mounted near opposite sides of the housing and relatively close to the edges of said bevel gears, bevel pinions mounted between said spur gears and bevel gears, each bevel pinion being mounted to rotate with one spur gear and mesh with one of said bevel gears, and driving mechanism including a differential mechanism and spur pinions actuated thereby to drive said spur gears.

38. The combination in a driving axle of a housing, a pair of axle sections arranged end to end therein, opposed bevel gears of the same size connected to said sections to drive them, spur gears of the same size disposed at an angle to and relatively close to the edges of said bevel gears, bevel pinions disposed between said gears and mounted to rotate with said spur gears, and mesh with said bevel gears, a driving shaft and differential mechanism thereon, spur pinions actuated by each side of the differential to drive said spur gears.

39. In mechanism of the class described the combination with a pair of alined driven axle sections of bevel gears connected thereto, spur gears mounted with their axes in the same plane as said bevel gears and with their faces relatively close to the edges of said bevel gears, whereby said bevel gears are included within vertical planes through the outside faces and the edges of said spur gears, bevel pinions actuated by said spur gears to drive said bevel gears, driving mechanism positioned in another horizontal plane and comprising a driving shaft adapted to be connected to a propeller shaft, a differential mechanism and spur pinions actuated thereby to drive said spur gears.

40. In mechanism of the class described the combination with a pair of axle sections, of a driving shaft, a differential mechanism thereon, speed reducing gearing in two stages mounted between said differential and axle sections and comprising pinions and gears in trains, each being operated by one side of the differential, the corresponding pinions and gears of each train being of the same size, one pair of said gears being supported in spaced relation, the other pair of gears being spaced apart and arranged between said first mentioned gears, pinions mounted to rotate with said first mentioned gears to drive said last mentioned gears, and means on the differential mechanism to actuate said first mentioned gears.

41. The combination in a driving axle of a housing, a pair of axle sections arranged end to end therein, gears connected thereto for driving said sections, pinions meshing with said gears, additional gears mounted to drive said pinions, all of said pinions and gears having their axes in the same plane, said gears being disposed in a substantially rectangular formation, a driving shaft for said mechanism having a differential mechanism associated therewith and means operated by each side of the differential mechanism to actuate said additional gears, said differential and actuating means being disposed in a different horizontal plane from said gears.

42. The combination in a driving axle of a housing, a pair of axle sections arranged end to end therein, gears connected thereto for driving said sections, pinions meshing with said gears, additional gears mounted to drive said pinions, all of said pinions and gears having their axes in the same plane, said gears being disposed in a substantially rectangular formation and inside the vertical planes through the outside faces and the edges of said additional gears, a driving shaft for said mechanism having a differential mechanism associated therewith and means operated by each side of the differential mechanism to actuate said additional gears, said differential and actuating means being disposed in a different horizontal plane from said gears.

43. The combination in a driving axle of a housing, a pair of axle sections arranged end to end therein, bevel gears connected thereto for driving said sections, pinions meshing with said gears, spur gears mounted to drive said pinions, all of said pinions and gears having their axes in the same plane, said gears being disposed in a substantially rectangular formation, a driving shaft for said mechanism having a differential mechanism associated therewith and means operated by each side of the differential mechanism to actuate said spur gears, said differential and actuating means being disposed in a different horizontal plane from said gears, whereby a compact relatively small speed reduction mechanism is obtained.

44. The combination in a driving axle of a housing, a pair of driven axle sections arranged end to end therein, opposed gears mounted on said axle sections to drive them, a driving shaft mounted in said housing and carrying a differential mechanism, and speed reduction gearing between said driving shaft and said driven axle sections, said driving shaft being disposed in a substantially horizontal plane above said driven axle sections and above said opposed gears, whereby said driving shaft may be positioned in substantial alinement with a propeller shaft located above the plane of the driven axle sections.

45. The combination in a driving axle of a housing, a pair of driven axle sections arranged end to end therein and having bevel gears mounted thereon for rotation therewith, a driving shaft mounted in said housing and carrying a differential mechanism, supports in said housing, speed reducing gearing mounted on said supports and comprising spur gears and bevel pinions, and pinions actuated by said differential mechanism to mesh with said spur gears, said driving shaft being disposed in a substantially horizontal plane above said driven axle sections whereby said driving shaft may be positioned in substantial alinement with a propeller shaft located above the plane of the driven axle sections.

46. The combination in a driving axle of a housing, a pair of driven axle sections arranged end to end therein and having bevel gears thereon, supports carried by the housing, spur gears and bevel pinions mounted on said supports, said bevel pinion meshing with said bevel gears and actuated by said spur gears, a driving shaft mounted in said housing and actuating the differential mechanism, spur pinions operated by each side of said differential and meshing with said spurs, said driving shaft section being disposed in a horizontal plane and positioned substantially above the plane of said driven axle sections.

47. The combination in a driving axle of a housing, a pair of driven axle sections arranged therein, a driving shaft mounted therein at an angle to said axle sections, a supporting member disposed beneath said driving shaft, said driving shaft and supporting member having their opposite ends carried by removable members forming walls of the housing and speed reduction mechanism mounted on said supporting member and arranged to transmit power from said driving shaft to said axle sections.

48. In mechanism of the class described the combination with oppositely extending tubular members, the inner ends of which are shaped to form top and bottom walls of a housing and driven axle sections mounted in said tubular members, of a pair of removable plates forming the front and rear walls of said housing, a driving shaft and a supporting member carried by said removable plates, a differential mechanism associated with said driving shaft, and speed reducing gearing between said differential mechanism and said driven axle sections, said gearing having elements rotatably mounted on said supporting member.

49. The combination in a driving axle of a housing, a pair of axle sections arranged therein, gears connected to said axle sections, pinions meshing with said gears, additional gears mounted to drive said pinions, said axle gears and said additional gears being disposed in a substantially box-like relation, supports for said pinions and additional gears, said supports being carried by the housing walls, said housing walls being disposed relatively close to said axle gears and additional gears whereby a compact speed reduction mechanism is obtained in a relatively small housing, a driving shaft for said mechanism having a differential mechanism associated therewith and means operated by said differential mechanism to actuate said additional gears.

50. In mechanism of the class described the combination with oppositely extending tubular members the inner ends of which are shaped to form the top and bottom walls of a housing and driven axle sections mounted in said tubular members, of gears carried by said sections, a pair of removable plates forming the front and rear walls of said housing, a supporting member carried by said removable plates, said supporting member being recessed to receive the ends of said driven axle sections and having gears and pinions mounted on its ends, a driving shaft carried by said removable plates, a differential mechanism actuated thereby, means operated by each side of said differential mechanism to drive the gears mounted on said supporting member, said pinions meshing with said gears carried by the driven axle sections.

51. In mechanism of the class described the combination with oppositely extending tubular members, the inner ends of which are shaped to form top and bottom walls of a housing and driven axle sections mounted in said tubular members, of bevel gears carried by said axle sections, a pair of removable plates forming the front and rear walls of said housing, a supporting member carried by said removable plates at an angle to said axle sections and having a spur gear and bevel pinion mounted to rotate therewith upon each end of the supporting member, a driving shaft carried by said removable plates and having a differential mechanism associated therewith, spur pinions actuated by each side of said differential to drive said spur gears, said front and rear walls of said housing being disposed relatively close to the spur gears, said inner ends of the tubular members being disposed relatively close to said bevel gears whereby a relatively compact axle housing having a relatively great road clearance is obtained.

52. The combination in a speed reducing mechanism for a driving axle, of a housing, a pair of driven axle sections arranged end to end therein, bevel gears connected thereto, supports in said housing, spur gears and bevel pinions carried by said supports, said gears and pinions having their axes in the same plane as said axle sections, each of said bevel pinions meshing with one of said bevel gears, a driving shaft and differential mechanism with means to drive said spur gears disposed in said housing and above said axle sections, said bevel gears and spur gears only projecting a substantial distance below the plane of said axle sections whereby only relatively slow moving gears and a relatively small surface of metal is moved substantially below the plane of the axle sections.

53. The combination in a driving axle of a housing having an enlarged central chamber, a pair of driven axle sections arranged end to end therein, a support carried by said housing, spur gears and relatively small bevel pinions mounted at opposite sides of the said chamber to rotate on said support, bevel gears connected to said axle sections and driven by said bevel pinions, a driving shaft and differential mechanism disposed above said gearing, spur pinions actuated by said differential to drive said spur gears, said spur gears and bevel pinions and gears having their axes in the same plane, whereby said spur gears and bevel gears, only, project into the bottom of said chamber.

54. The combination in a driving axle of a housing having an enlarged central chamber, a pair of driven axle sections arranged end to end therein, a driving shaft and differential mechanism disposed above said axle sections, supports in said housing, speed reducing gearing comprising spur gears and bevel pinions mounted on supports to operate between said differential mechanism and said axle sections, said gearing comprising spur gears and bevel pinions, bevel gears connected to said axle sections, said bevel gears and said speed reducing gearing having their axes in the same plane as said axle sections whereby said relatively slow moving spur gears and bevel gears, only, project into the bottom of said chamber.

55. The combination with a pair of aligned driven axle sections of a driving shaft section, a differential mechanism mounted on said driving shaft section and actuated thereby, opposed bevel gears having a driving connection with said axle sections, trains of speed reducing gearing interposed between said differential mechanism and said axle sections, each train of gearing comprising spur gearing operated from either side of the differential mechanism and bevel pinions between said spur gearing and the bevel gears on said axle sections, said bevel pinions and gears being actuated by said spur gearing whereby spinning of one driven axle section with respect to the other is resisted when the traction is reduced on the former.

In testimony whereof I affix my signature.

LEO MELANOWSKI.